United States Patent [19]

Robbins

[11] 4,194,242
[45] Mar. 18, 1980

[54] METHOD AND SYSTEM FOR DETERMINING INTEREST RATES

[75] Inventor: Robert Robbins, Atlanta, Ga.

[73] Assignees: Patricia Ann Cotts; Nancy Fern Hamburger, both of Atlanta; Betty B. Robbins; William Norman Robbins, both of Decatur, all of Ga.

[21] Appl. No.: 725,535

[22] Filed: Sep. 22, 1976

[51] Int. Cl.² ............................................ G06F 13/00
[52] U.S. Cl. .................................... 364/200; 235/379; 340/149 R
[58] Field of Search ... 364/200 MS File, 900 MS File, 364/300; 235/156, 379, 380; 340/146.2, 149 R

[56] References Cited

U.S. PATENT DOCUMENTS

| | | | |
|---|---|---|---|
| 3,228,006 | 1/1966 | Neilson et al. | 364/200 |
| 3,308,439 | 3/1967 | Tink et al. | 364/200 |

*Primary Examiner*—Leo H. Boudreau
*Attorney, Agent, or Firm*—Sherman & Shalloway

[57] ABSTRACT

A method and a system are provided wherein an interest rate fluctuates according to the ratio of a borrower's funds on deposit with the lender, to the borrower's outstanding indebtedness (or to the outstanding indebtedness combined with line of credit) at any time, and for the duration of a selected period of time. The ratio of the borrower's funds on deposit with the lender, to the borrower's loan balance (or to the borrower's loan balance combined with line of credit), forms a Compensating Balance.

This method and system provide for each individual lender to set a "par point", which is the Compensating Balance required by the lender in order for the borrower to qualify for a pre-determined interest rate. The interest rate of the loan automatically fluctuates inversely to the fluctuation of the borrower's Compensating Balance from the "par point". As the Compensating Balance increases, the interest rate decreases, and as the Compensating Balance decreases, the interest rate increases.

10 Claims, 1 Drawing Figure

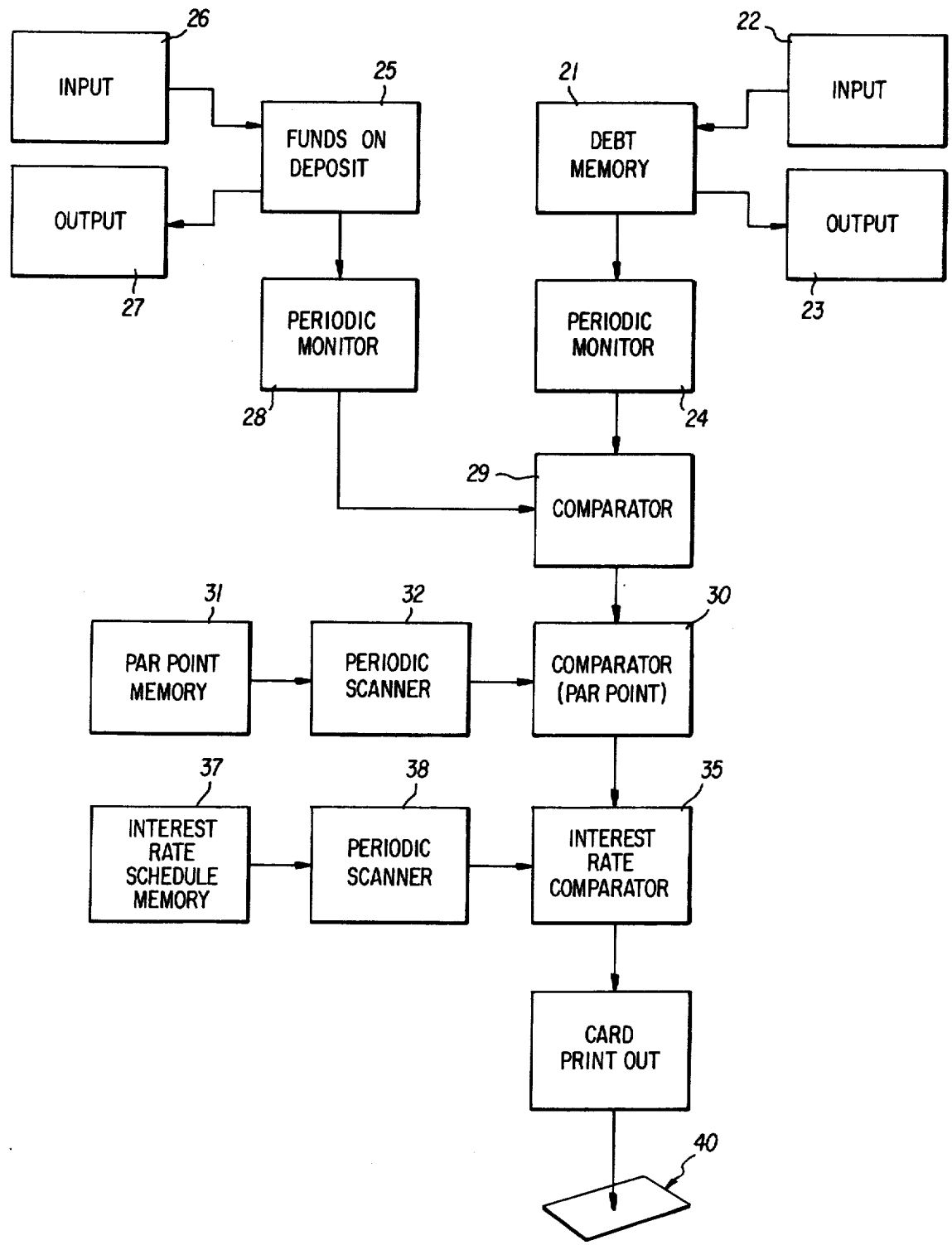

METHOD AND SYSTEM FOR DETERMINING INTEREST RATES

BACKGROUND OF THE INVENTION

1. Field of the Invention

This invention relates to methods of and systems for accounting, and more particularly, this invention relates to methods of and systems for determining interest rates.

2. Background Considerations

It is customary for banks to expect, and frequently to require, borrowers to maintain funds on deposit with the bank equal to a certain percentage of the borrower's loan, or of a combination of the borrower's loan and the line of credit extended by the bank, or of the line of credit, only.

In current banking terminology these funds on deposit are referred to as "Compensating Balance". Compensating Balance is the amount of funds the borrower has on deposit in the lender bank, as a percentage of the outstanding loan balance, or as a percentage of the outstanding loan balance combined with a percentage of the line of credit, or possibly as a percentage of the line of credit only. Bankers refer to Compensating Balance in terms of percentages rather than dollars. For example, they would refer to a 20% Compensating Balance rather than to a $14,000 Compensating Balance.

Borrowers are reluctant to leave funds on deposit with a bank because they could be earning income with the funds if they were not on deposit. Funds on deposit are an advantage to the bank because it gives them funds which they can lend to earn additional income.

Therefore, it is an advantage for the bank to offer an inducement to the borrower to leave sizeable balances on deposit, and a lower interest rate on their loan would be such an inducement.

Large corporations usually have an officer who is responsible for investing temporarily idle funds to earn maximum returns. The instant invention would save time for this officer, because the funds could be left on deposit with the bank to reduce the interest rate on the loan, rather than the officer's having to search for a savings institution or other short-term investment for the funds. This also enhances the borrower/lender relationship.

Funds on deposit are to a bank as inventories are to a business and are expected to produce a given gross profit. The instant invention tends to stabilize funds available for lending and, thereby, stabilize the bank's gross profit.

It is customary for banks to lend money at prime rate plus points and fractional points above prime rate. For example, if prime rate is 6%, they may quote an interest rate of "2 points above prime", making the interest rate 8%. This gives the bank a gross markup of 2.5%, using the standard retail system of inventory (6 divided by 0.75 equals 8). When the prime rate goes up or down, and they add the same points, their markup percentage changes. The instant invention will be advantageous to the bank in that it offers a system for controlling their desired markup, because it facilitates the use of percentages of prime rate rather than using points. The percentages used will be established by each bank. They should tend to decrease the gross profit percentage as the prime rate increases, and vice versa.

Although the borrower and the lender may agree on an amount of Compensating Balance when the loan is initiated, lenders now have no easy way of automatically comparing total funds on deposit, loan balances, line of credit, and agreed Compensating Balance. Generally, this is done manually from average-balance figures furnished the loan officer, a time-consuming process. Also, the figures may be furnished at longer time intervals than the bank would prefer, at which time the Compensating Balance may have been below the agreed amount. The bank then notifies the borrower to increase the funds on deposit.

If banks utilize the instant invention through a computer, the computer could be programmed to notify the loan officer of irregularities in the borrowers' accounts. For example, the load officer could be notified daily (or with whatever frequency the bank desires) of borrowers whose Compensating Balance has reached the critically-low point. This also may alert the loan officer to the possibility of financial difficulty of the borrower. Additional information, not a part of the instant invention, could be furnished the loan officer with very little added expense, such as deliquent interest payments, deliquent loan reductions, and/or delinquent loan payoffs.

The instant invention will save bank personnel time by automatically relating the funds on deposit to the loan balance (or to a combination of loan balance and line of credit—see explanation of Compensating Balances on pages 8 and 9), thereby producing a Compensating Balance, and relating it to the agreed Compensating Balance, without the loan officer's having to make the manual comparisons and computations. This would enable each loan officer to handle more accounts, permitting the bank to have a smaller staff. The loan officer would also have more current information on which to make judgments.

The instant invention will improve relations between borrower and lender. The lender will be helping the borrower to keep interest rates low by notifying the borrower when the Compensating Balance is less than agreed, rather than criticizing the borrower for not maintaining the agreed Compensating Balance.

OBJECTS OF THE INVENTION

In view of the aforementioned considerations, it is an object of this invention to provide a new and improved method of, and system for, determining and computing the interest rate on commercial loans.

It is a further object of the instant invention to provide a new and improved method of, and system for, computing interest rates, wherein the interest rate is determined by the Compensating Balance of the borrower.

It is an additional object of the instant invention to provide a new and improved method of, and system for, determining and computing interest rates, wherein the interest rate is automatically adjusted periodically as directed by the borrower's current Compensating Balance.

It is still another object of the instant invention to provide a new and improved method of, and system for, determining and computing interest rates wherein the method and system are flexible to accomodate various conditions.

SUMMARY OF THE INVENTION

In view of these and other objects, the instant invention contemplates a method of, and system for, computing interest rates, wherein a borrower's interest rate is set at a par point which is a ratio of the borrower's funds on deposit to the borrower's indebtedness, which ratio is the borrower's Compensating Balance. Periodically the borrower's funds on deposit and amount of indebtedness are monitored. The borrower's outstanding indebtedness and funds on deposit are then compared to determine a current Compensating Balance, and this Compensating Balance is compared to the Compensating Balance used to determine the par point. If the Compensating Balance exceeds the Compensating Balance on which the par point was determined, then the borrower's interest rate is decreased, and if the Compensating Balance is less than the Compensating Balance determining par point, the borrower's interest rate increases.

BRIEF DESCRIPTION OF THE DRAWING

Referring now to the drawing, there is shown portions of a general purpose computer of the type normally used to perform accounting services.

DETAILED DESCRIPTION

The computer includes a debt memory 21, which has individual addresses identified with various borrowers, in which the outstanding indebtedness of each borrower is recorded. The amount of indebtedness varies periodically, according to the money paid on the debt, as identified by input 22, or money loaned on a particular account, as identified by output 23. For purposes of convenience, the input 22 and output 23 may be embodied in a conventional send and receive printer.

The debt portion of the memory 21 is scanned periodically by a monitor 24. The monitor 24 may also scan the debt memory on demand. The interval between scanning may be, for example, every quarter, every month, every week or even every day. The computer, therefore, always knows how much outstanding indebtedness is attributable to each borrower.

The computer also includes a funds-on-deposit memory 25. As with the debt memory, the funds-on-deposit memory includes an input 26 for deposits and an output 27 for withdrawals, which may be embodied in a printer. For each address in the funds-on-deposit memory 25, there is a corresponding address in the debt memory 21.

The funds-on-deposit memory is monitored periodically by a monitor 28, which functions similar to the monitor 24 associated with the debt memory. The monitor 28 can function on demand, so that the funds-on-deposit may be determined at any desired time, and the monitor 28 can check the funds on deposit automatically during time periods of a quarter, month, week or day. Preferably, the monitor 28 functions simultaneously with the monitor 24; however, simultaneous operation is not mandatory.

The output from the monitors 24 and 28 are fed into a comparator 29, which contains a division circuit that sets up a ratio between the output of the monitors 24 and 28. For convenience, this output can be expressed as the ratio of funds on deposit to outstanding loan or some combination of indebtedness and line of credit, called Compensating Balance. This Compensating Balance is used to determine the interest rate on outstanding indebtedness.

The par point, entered into the memory 31, is decided on by the bank and agreed to by the borrower at the inception of the loan.

The output of the comparator 30 is fed into an interest comparator 35, which also receives an input from a memory 37 that stores an interest rate schedule for each account. The interest rate schedules may be standard schedules or may be schedules which are specifically associated with each account. If the schedules are standard, then the address of each account may include a code, which identifies the standard schedule being used. In the comparator 35, the compensating balance is then matched to the interest rate associated therewith. This information is subsequently printed out on a card in a standard fashion. The card includes such information as the date, outstanding indebtedness, funds on deposit, par point, the Compensating Balance and the interest rate.

In practicing the foregoing invention, the Compensating Balance is related to a base rate and to a Compensating Balance Variation Factor (CBVF). Both the base rate and the CBVF are agreed on in advance by the lender and the borrower. Generally, to arrive at the actual interest rate the lender may use any method desired for his calculations. However, the method for predetermining the possible fluctuations of interest rate is preagreed by both the lender and the borrower.

Following are four examples of the many ways banks may use Compensating Balance:

Some banks use Compensating Balance as it relates to the outstanding loan balance. For example:

(1) A borrower has a line of credit of $100,000, an outstanding loan balance of $70,000, and the bank requires a Compensating Balance of 20% of the outstanding loan balance, which is $14,000 funds on deposit.

Other banks consider the Compensating Balance as it relates to both the outstanding loan balance and the line of credit the bank extends to the borrower, or a portion thereof. For example:

(1) A borrower has a line of credit of $100,000, an outstanding loan balance of $70,000, and an agreed Compensating Balance of 20% of the loan balance, $14,000, plus an agreed Compensating Balance of 10% of the $30,000 unused portion of the line of credit, requiring an additional $3,000 in funds on deposit, a total of $17,000 in funds on deposit.

(2) The bank requires a Compensating Balance on the full amount of the line of credit plus an additional Compensating Balance on the outstanding loan. Line of credit $100,000, outstanding loan balance $70,000, and agreed Compensating Balance of 5% on the line of credit, plus an agreed Compensating Balance of 15% of the outstanding loan balance, totaling $15,500 funds on deposit.

Presently, it is not in common useage, but banks may require a Compensating Balance on the line of credit only. For example:

(1) Line of credit $100,000, loan balance $70,000, an agreed Compensating Balance of 15% of the line of credit, requiring $15,000 funds on deposit.

The following examples use Compensating Balance as the percentage of funds on deposit to loan balances, only, and do not take into consideration Compensating Balance as the percentage of funds on deposit to the line of credit, or as the percentage of part of the line of credit.

EXAMPLES

The Table 1 is a schedule which has, as its base rate, an assumed prime rate of 8%. The base rate can be a discount rate or any other rate that the lender selects. the CBVF. For example, a lender might select a 10% Compensating Balance as the par point with whatever CBVF they wish. The base rate, the spread of the Compensating Balance percentages and/or the CBVF may vary between the interest rate tables.

TABLE 1

| INTEREST RATE CHART | | | | | | | | | | | | | |
|---|---|---|---|---|---|---|---|---|---|---|---|---|---|
| Base Rate: Prime Rate 8% | | | | | | | | | | | | | |
| If compensating Balance Percent is: | 0 | 5 | 10 | 15 | PAR POINT 20 | 30 | 40 | 50 | 60 | 70 | 80 | 90 | 100 |
| Compensating Balance Variation Factor Add to or (subtract from) Base Rate this percent of Base Rate: | 102.5 | 77.5 | 58.75 | 46.25 | 40.0 | 33.75 | 27.5 | 21.25 | 15.0 | 8.75 | 2.5 | (3.75) | (10.0) |
| Actual Interest Rate on Loan is: | 16.2 | 14.2 | 12.7 | 11.7 | 11.2 | 10.7 | 10.2 | 9.7 | 9.2 | 8.7 | 8.2 | 7.7 | 7.2 |

The borrower's Compensating Balance determines the CBVF which, in turn, determines the interest charged the borrower at any given time. By using the aforedescribed system, the lenders can obtain a borrower's Compensating Balance as often as they elect to do so, i.e., daily, monthly, quarterly, etc., and the interest may be computed for that period, in accordance with the schedule which the lender and borrower have prearranged. The schedule of Table 1 is entered into the interest rate schedule memory 37.

Instead of using percentages, interest rates or fractions thereof could be used in the CBVF. For example, the percentage 40 is actually 3.2% above a prime rate of 8%, because 40% of 8% equals 3.2%. Consequently, the interest on the loan is 11.2%, i.e., 8% plus 3.2%

Table 2 is a schedule illustrating an approach in which the Compensating Balance percentages are calculated in 1% increments between 30% and 40%. This type of schedule accommondates situations in which a great deal of money is involved, necessitating relatively precise interest calculations.

TABLE 2

| INTEREST RATE CHART (If Compensating Balance is between 30% and 40% of Loan Balance) | | | | | | | | | | |
|---|---|---|---|---|---|---|---|---|---|---|
| Base Rate: Prime Rate 8% | | | | | | | | | | |
| If Compensating Balance percent is: | 31 | 32 | 33 | 34 | 35 | 36 | 37 | 38 | 39 | 40 |
| Compensating Balance Variation Factor Add this percent of Base Rate to Base Rate: | 33.125 | 32.5 | 31.875 | 31.25 | 30.625 | 30.00 | 29.375 | 28.75 | 27.125 | 27.5 |
| Actual Interest Rate on Loan: | 10.65 | 10.6 | 10.55 | 10.5 | 10.45 | 10.4 | 10.35 | 10.3 | 10.25 | 10.2 |

Table 3 illustrates a third example of an interest rate chart, which may be used for another type of borrower, who is a "prime borrower" borrowing at a prime rate of 8%. Note, in this chart, the par point is identified at a Compensating Balance percent of 20, a CBVF of zero and an actual interest rate of 8%. As set forth, schedules of Tables 1, 2 and 3 are stored in the interest rate schedule memory and can be obtained in a well-known fashion by the scanner 38.

TABLE 3

| INTEREST RATE CHART | | | | | | | | | | | | | |
|---|---|---|---|---|---|---|---|---|---|---|---|---|---|
| Base Rate: Prime Rate 8% | | | Par point ↓ | | | | | | | | | | |
| If Compensating Balance percent is: | 5 | 10 | 15 | 20 | 30 | 40 | 50 | 60 | 70 | 80 | 90 | 100 | 110 |
| Compensating Balance Variation Factor Add to or (subtract from) Base Rate this percent of Base Rate: | 37.5 | 18.75 | 6.25 | 0 | (6.25) | (12.5) | (18.75) | (25.0) | (31.25) | (37.5) | (43.75) | (50.0) | (56.25) |
| Actual Interest Rate on Loan is: | 11.0 | 9.5 | 8.5 | 8.0 | 7.5 | 7.0 | 6.5 | 6.0 | 5.5 | 5.0 | 4.5 | 4.0 | 3.5 | equals 11.2%. A standard procedure with banks is to charge the prime rate plus interest points. For ease of computation, actual percentage points, or fractions thereof, could be used instead of the percentages of the base rate. As set forth before, the lenders will set their own Compensating Balance Variation Factors (CBVF). In Table 1, 20% of the loan was identified as the par point in the Compensating Balance because many lenders expect borrowers to maintain a 20% Compensating Balance. This ratio, of course, may vary from one lender to another.

In using this system, lenders will determine their own pattern of spread in the Compensating Balance and in the CBVF. For example, a lender might select a 10% Compensating Balance as the par point with whatever CBVF they wish. The base rate, the spread of the Compensating Balance percentages and/or the CBVF may vary between the interest rate tables.

The system, according to the instant invention, enables the lender and borrower to agree in advance on a fluctuating interest rate on borrowed money, from interest rate schedules which are based on a base rate for interest rates, and factors which are added to or subtracted from the base rate (CBVF). These factors combine to give a printout 40 of interest charged to borrowers.

Any lender in establishing an Interest Rate Chart may use any base rate, any Compensating Balance percent, any spread of Compensating Balance Variation Factors (or percentage points), and any combination thereof.

What is claimed is:

1. A method for providing data regarding interest rates comprising the steps of:

storing the value of a borrower's funds on deposit in a computer memory;

storing the amount of a borrower's indebtedness in the computer memory;

monitoring the computer memory periodically by a scanning means connected to the computer memory to determine the extent of the borrower's indebtedness and the value of the borrower's funds on deposit at a given time, the scanning means providing at its output a signal corresponding to the borrower's indebtedness and funds on deposit;

comparing the borrower's funds on deposit to the borrower's indebtedness by a division circuit means which is connected to the scanning means to determine the ratio of output of the scanning means to form a Compensating Balance; and increasing the interest rate provided by a printout connected to the division circuit means, if the Compensating Balance is less than par point and decreasing the interest rate provided by the printout if the Compensating Balance is greater than par point.

2. The method of claim 1, further including the steps of:

determining and storing in the computer memory a par point for initial Compensating Balance and setting an interest rate for that par point; and comparing by a first comparator means subsequently determining Compensating Balance to the initial Compensating Balance to determine whether to increase or decrease the interest rate.

3. The method of claim 2 further including steps of:

storing a table of values in the computer memory, wherein a series of Compensating Balances are matched to corresponding interest rates; and comparing by a second comparator means the determined Compensating Balance to the table, in order to determine the interest rate provided by the printout.

4. A system for computing interest comprising:

first memory means for storing the value of a borrower's funds on deposit and providing at an output a first signal which corresponds to the funds on deposit;

second memory means for storing the amount of a borrower's indebtedness and providing at an output a second signal which corresponds to the indebtedness;

third memory means for storing the amount of a borrower's line of credit and providing at an output a third signal which corresponds to the line of credit;

means for scanning said first, second and third signals periodically, said means for scanning connected to the outputs of said first, second and third memory means and providing at an output a fourth signal corresponding to the extent of the borrower's loan balance and line of credit and the value of the borrower's funds on deposit at a given time;

means for comparing the borrower's funds on deposit to the borrower's loan balance and line of credit, said means for comparing connected to the output of said means for scanning providing at an output a fifth signal corresponding to a Compensating Balance; and means for determining connected to the output of said means for comparing providing at an output a sixth signal corresponding the interest rate based on the Compensating Balance.

5. The system of claim 4 wherein:

said first memory means is comprised of a first memory having an input for receiving deposits and an output for providing withdrawals;

said second memory means is comprised of a second memory having an input for receiving money paid to an account and an output for providing money loaned from an account;

said means for scanning is comprised of a first periodic monitor connected to said first memory and a second periodic monitor connected to said second memory;

said means for comparing is comprised of a division circuit; and said means for determining is comprised of a par point memory connected to a periodic scanner connected to a par point comparator, and interest rate schedule memory connected to a periodic scanner connected to an interest rate comparator connected to a card printout, said par point comparator connected to said division circuit and said interest rate comparator.

6. An apparatus for providing data regarding a borrower's interest rates computed from a value of a borrower's funds on deposit, a value of the borrower's indebtedness and a value of the borrower's interest rate at a par point comprising:

first memory means having an input and an output, said input for receiving information regarding transactions relating to the borrower's funds on deposit and the borrower's indebtedness said output providing a signal corresponding to the borrower's funds on deposit and the borrower's indebtedness;

first comparator means having an input and an output, the input of said comparator means connected to the output of said memory means, and the output of said comparator means providing a signal corresponding to a Compensating Balance which is a ratio of the borrower's funds on deposit to the borrower's indebtedness;

second memory means having an input for receiving information regarding an interest rate and par point schedule and having an output providing a signal which corresponds to the interest rate and par point schedule;

second comparator means for comparing the output of said second memory to the output of said first comparator means, said second comparator means having an output providing a signal which corresponds to the indebtedness, funds on deposit, par point, Compensating Balance and interest rate; and print means having an input for receiving the output of said second comparator, said print means providing a card having information corresponding to the output signal of said second comparator.

7. The apparatus of claim 6 wherein said first memory means further comprises a periodic monitor and said second memory means further comprises a periodic scanner.

8. The apparatus of claim 7 wherein said first comparator is a division circuit.

9. The apparatus of claim 8 wherein said first memory means has inputs for receiving money paid to an account and for receiving deposits and has outputs for providing money loaned from accounts and for providing withdrawals.

10. The apparatus of claim 9 wherein said print means is a send and receive printer.

* * * * *